Oct. 11, 1949.  L. H. GARNER  2,484,025
RING CLAMP FOR INSTALLING CLUTCH SHAFT
FLANGE RINGS ON A CLUTCH SHAFT FLANGE
Filed March 26, 1946

Inventor
LEXIE H. GARNER

Attorney

Patented Oct. 11, 1949

2,484,025

UNITED STATES PATENT OFFICE 2,484,025

RING CLAMP FOR INSTALLING CLUTCH SHAFT FLANGE RINGS ON A CLUTCH SHAFT FLANGE

Lexie H. Garner, Newport, N. C.

Application March 26, 1946, Serial No. 657,319

1 Claim. (Cl. 24—259)

(Granted under the act of March 3, 1883, as amended April 30, 1928; 370 O. G. 757)

The present invention relates to ring clamps for installing clutch shaft flange ring on a clutch shaft flange.

In the past, the installation of clutch shaft flange rings on a clutch shaft has been a slow and tedious task, often resulting in the installation of seriously distorted and damaged rings.

It is an object of the present invention to provide a spring clamp for use in assembling flange rings on a clutch shaft flange.

Another object of the present invention is the provision of a spring clamp with element engaging means.

A still further object of the present invention is the provision of a spring clamp that will hold a ring firmly in place during assembly.

Other objects and advantages of the invention will become apparent during the course of the following detailed description, taken in connection with the accompanying drawing, forming a part of this specification, and in which drawing.

Figure 1:
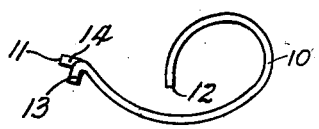
Fig. 1 is a front elevational view of a spring clamp, illustrating the configuration of the clamp and the gripping means.
Figure 2:
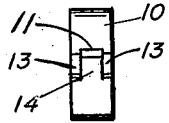
Fig. 2 is an end elevational view of Fig. 1.

Referring to the drawings the numeral 10 represents a spring clamp of spring strip material framed or bent into approximately a spiral configuration, one end 11 of the strip being looped inwardly, the opposite end 12 extending outwardly and beyond the end 11. The end 11 is provided with a pair of gripping fingers 13 that are bent at an angle to the strip 10, the fingers being on each edge of the strip. Between the fingers 13 is a tongue 14 that extends outwardly beyond the gripping fingers forming an element engaging means.

Figure 3:
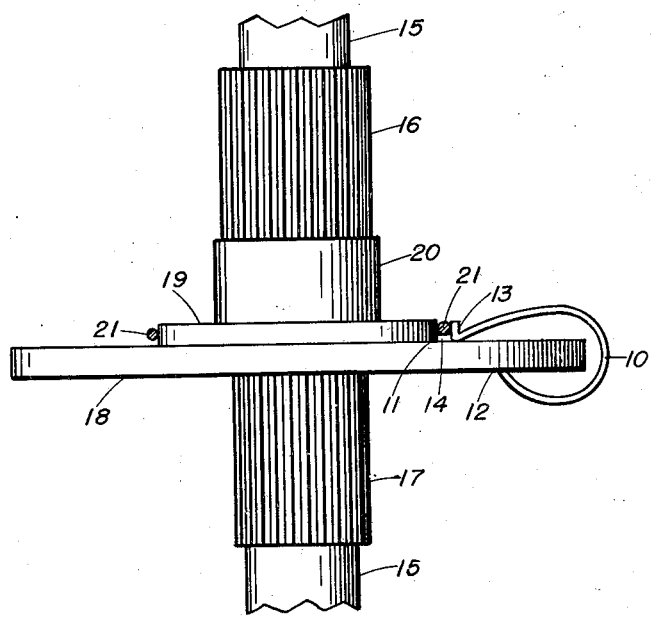
Fig. 3 is an elevational view of a clutch shaft and flange and illustrating the spring clamp holding a ring on the shaft flange, the ring being shown in section and parts being shown fragmentarily.

In Fig. 3 of the drawings there is illustrated the present device in use, and in this showing the numeral 15 represents a clutch shaft that is shown fragmentarily. The shaft 15 carries pinion gears 16 and 17, a clutch plate 18, a flange 19 and a hub 20. Encircling the flange 19 is a clutch shaft flange ring 21. The ring 21 is held impinged on the peripheral wall of the flange 19 by the fingers 13 the top face of the tongue 14 engaging the bottom portion of the flange ring 21. The end 11 of the spring clamp engages the bottom face of the clutch plate 18 forming a gripping means. From the above it can be seen that the clutch shaft flange ring is held firmly in place during assembly of other parts, and that damage to the ring during assembly is prevented.

The invention described herein may be manufactured and used by or for the Government of the United States of America for governmental purposes without the payment of any royalties thereon or therefor.

What I claim is:

A clamping device for positioning a ring on the hub of a shaft flange comprising a spiral-like resilient strip one end of which extends beyond and overlaps the other end, a pair of spaced fingers integral with and extending outwardly at approximately right angles to surface of the strip at said one end, a tongue integral with and extending forwardly from said one end, said tongue extending from a position between said fingers and the said other end of the strip extending inwardly of said spiral-like resilient strip whereby, when said clamping device is placed radially over the edge of said flange to position a ring on said hub the tongue projects between the ring and the flange and said fingers bear upon the outside periphery of said ring, the said device holding the ring in position on said hub by frictional engagement with said flange.

LEXIE H. GARNER.

REFERENCES CITED

The following references are of record in the file of this patent:

UNITED STATES PATENTS

| Number | Name | Date |
|---|---|---|
| D. 30,501 | Wright | Apr. 4, 1899 |
| 670,502 | Anderson | Mar. 26, 1901 |
| 1,379,476 | Parr | May 24, 1921 |
| 1,564,834 | Dowling | Dec. 8, 1925 |
| 1,678,622 | Horne | July 24, 1928 |
| 1,797,091 | Knapp | Mar. 17, 1931 |